United States Patent [19]

Hendricks

[11] Patent Number: 4,905,405
[45] Date of Patent: Mar. 6, 1990

[54] MARINE ANIMAL TRAP ENTRANCE GATES

[76] Inventor: Larry O. Hendricks, 2848 NW. 94th, Seattle, Wash. 98117

[21] Appl. No.: 327,083

[22] Filed: Mar. 22, 1989

[51] Int. Cl.$^4$ ............................................. A01K 69/08
[52] U.S. Cl. ....................................................... 43/100
[58] Field of Search .................. 43/100, 101, 102, 103, 43/104, 105

[56] References Cited

U.S. PATENT DOCUMENTS

| | | | |
|---|---|---|---|
| 1,619,366 | 1/1927 | Peterson | 43/100 |
| 2,119,828 | 6/1938 | Nordenstam | 43/100 |
| 3,271,894 | 9/1966 | Manno et al. | 43/100 |
| 3,497,989 | 3/1970 | Schultz et al. | 43/100 |
| 4,184,283 | 1/1980 | Wyman | 43/102 |

Primary Examiner—M. Jordan
Attorney, Agent, or Firm—Graybeal, Jensen & Puntigam

[57] ABSTRACT

A marine animal trap comprising entrance gate means including a plurality of plastic fingers having a relative buoyancy and arrangement to be maintained closed and to reclose by buoyancy action after an animal enters the trap by buoyant action. In preferred forms some fingers have a slight positive buoyancy and some have a slight negative buoyancy in water. A mounting frame suitably includes journal rods mounting said plurality of fingers for pivotal movement in a generally vertical manner, and stop means whereby when the trap is in water the nominal state of rest of at least some of the fingers is with the finger partially spanning the gate entrance and with such fingers in such position being restrained from outward pivotal movement, the fingers being nonetheless free to pivotally move inwardly so as to not impede animal ingress through the gate. The form, arrangement and placement of the fingers in the trap can vary. In one embodiment, all fingers of a given buoyancy are arranged coaxially in a row across the gate. In other embodiments, positively buoyant fingers and negatively buoyant fingers alternately arranged in each row of fingers.

22 Claims, 3 Drawing Sheets

MARINE ANIMAL TRAP ENTRANCE GATES

DESCRIPTION

1. Technical Field

This invention relates to entrance gates for aquatic animal traps. More particularly, the present invention involves improved entrance gates capable of being located on any generally vertical or horizontal surface of a marine animal trap as typically used to catch fish, crabs and other aquatic animals.

2. Description of the Prior Art

Fishing for crabs and fish by using traps is centuries old. As early as the end of last century, patents for crab traps started appearing in the U.S. An early design for preventing the escape of trapped crabs is shown in U.S. Pat. No. 1,619,366 issued to C. H. A. Petersen, which discloses a simple gate made of two interconnected wires attached so that they are hinged at their tops and hang down. A more recent example is found in U.S. Pat. No. 3,271,894 issued to J. J. Manno, in which the entrances are provided with convergent fingers made of a flexible material so that as the crab enters the trap the fingers bend outwardly to enlarge the opening and then close behind the crab after it has entered, thereby preventing its escape. Another recent example is U.S. Pat. No. 4,184,283 issued to R. E. Wyman, where a rectangular opening at the end of the entrance tunnel is covered by a set of flexible fingers attached to the entryway. The crab pushes its way up through the fingers by bending them and falls into the trap, if the crab tries to crawl out through the entrance opening, the weight of the crab on top of the fingers depresses the fingers onto the opening so as to prevent the crab from being able to escape from the trap. The flexibility of the fingers is affected by temperature as is their impact resistance, thereby increasing the likelihood of damage during use under cold conditions.

A primary concern in the design of a one-way entrance into a marine animal trap is ensuring that the least amount of resistance is encountered by a crab or fish entering the trap. If too much resistance is encountered by the crab or fish, it is likely not to enter the trap, defeating the purpose of the trap.

Another critical problem with one-way trap entrance devices is the severe conditions under which they must operate. The combination of the severe corrosive effects of salt water (if the trap is used in salt water) combined with the cold temperatures to which a trap may be subjected to while in use or during on deck storage, make material selection and the operating mode of one-way gates extremely critical. Flexible style one-way trap entrances suffer adverse effects due to the cold temperatures encountered both in the water and aboard the fishing vessel. One problem of the flexible finger type of entrance is that when placed in cold water, the fingers stiffen, making the entrance less inviting to crabs or fish.

Meanwhile, when on board a fishing vessel, the cold lowers the impact resistance of the fingers, making them brittle and susceptible to breakage which of course requires replacement. Another problem that has been encountered, when using metal-to-metal gates, is that a slight electrical current is generated when the trap is submerged in salt water (usually referred to as electrolysis) which corrodes the metal parts and also produces a voltage level to which the crabs and fish are sensitive and which they tend to avoid.

One of the problems this invention is directed to is that of allowing fishermen to catch only certain species of fish. This allows for the catching of species that are plentiful while allowing those that are immature or not plentiful to remain at large and unharmed. The problem of overfishing certain species runs the risk of not only eliminating that species from existence but also may have adverse effects on other species.

Another important problem that this invention is directed to alleviating is that of preserving the bottom of the ocean, lake, or river where traps are set. Currently, in open ocean areas large fishing trawlers use bottom nets which drag along the bottom, destroying the habitat in the area. This invention allows fishing to take place in an environmentally sound manner by not destroying the habitat of the creatures that it is intended to catch.

Typically, a fisherman baits a trap with a specific bait depending on the desired aquatic animal to be caught. The trap is then placed in the ocean, lake or river and sinks to the bottom. The trap is usually left on the bottom for several hours or several days. While the trap is submerged, aquatic animals enter the trap to feed on the bait in the trap. After sufficient time has elapsed for the trap to likely be filled with animals, the fisherman returns and pulls the trap to the surface in order to collect the trapped animals.

A significant problem with using a trap in this manner is that the stronger, healthier aquatic animals commonly have a tendency to be able to escape from the trap through the entrance tunnel. While there are many different configurations and styles of fish and crab traps, generally speaking most of them use a common type of converging entrance tunnel. A converging entrance tunnel is one that is typically made from a mesh or netlike material sewn together so as to form a funnel shaped entryway. This funnel shaped entry may be circular or conical in shape ending at a circular ring or may have flat sides converging to a rectangular entrance into the trap. The entrance is usually spaced above the bottom of the trap so that as the crab enters the trap it falls down to the bottom of the trap. A typical such trap has two entrance tunnels, one each on opposite sides of the trap with the entrance areas tied together to pull the entrance tunnels toward the center of the trap.

When a trap becomes filled with crabs during a period of submergence, otherwise known as a soak, the crabs fill up the trap until they are able to crawl out of the trap through the entrance tunnels. Another aspect of the entrance tunnels is that the crabs or fish must have unimpeded access into the trap through the tunnel. If they meet with too much resistance, they will not enter the trap.

SUMMARY OF THE INVENTION

It is an object of the present invention to provide a one-way gate for a trap designed to trap marine animals such that the gate resists the corrosive environment of the ocean and is tough enough to resist breakage under the rough handling and cold conditions encountered during its use.

It is a further object of this invention to provide an entrance gate allowing the trap to catch as many crabs or fish as possible by offering the least amount of resistance to an entering animal while at the same time not allowing those of catchable size that have already entered the trap to escape.

It is another object of this invention to provide a trap entrance gate that can permit crabs or fish of a species that cannot be legally caught, to leave the trap.

It is yet another object of this invention to provide a one-way entrance gate that can be used for trapping both crabs and fish.

And yet another object of this invention is to allow a trap to be used without requiring a particular top or bottom orientation, as well as not being affected by tidal currents.

Other features and advantages of the present invention will become apparent from the following detailed description of certain typical embodiments thereof, taken in conjunction with the accompanying drawings.

DESCRIPTION OF THE PREFERRED EMBODIMENT

In general, marine trap entrance gates according to the present invention involve a plurality of pivotally mounted plastic fingers arranged across or partially across the gate entrance. The fingers are typically fabricated of a plastic material which is slightly buoyant in water. Being buoyant, the fingers tend to float upwardly in the water and rest against stop means to in part close the entrance against animal egress. Certain of the fingers, suitably fabricated of the same material but slightly weighted so as to be slightly heavier than water and therefore tend to sink downwardly, are arranged to cooperate with the buoyant fingers and to in part also rest against stop means and close the entrance against animal egress. The arrangements of the fingers in conjunction with adjacent structure is such that when the fingers are in a nominal state of rest they engage stop means retaining them in gate entrance spanning positions, thus closing the gate entrance against animal egress yet leaving the fingers freely rotatable so as to provide little resistance to animal ingress.

Entrance gates according to the present invention are designed to operate with the array of fingers allowed to pivotally move in a generally vertical orientation. In the marine animal trap in the first embodiment of the invention illustrated, and as shown as FIGS. 1-4, the trap, generally indicated at T is of conventional form except for the construction of the entrance gates, with generally planar top and bottom wire mesh panels 10, 12 and planar sides 14, 16, and with convergent wire mesh end walls 18, 20 leading to two entrance gates which are suitable respectively identical and indicated at G. Overall, the trap T comprises a framework of welded bars, certain of which are indicated at 22, 24, 26, and 28, to which are attached various panels making up the body of the trap. As it will also be evident, interiorly of the trap is placed a suitable bait B to attract marine animals such as crabs C and cause them to enter the gates G and be retained in the trap interior until they can be removed.

Figure 1:
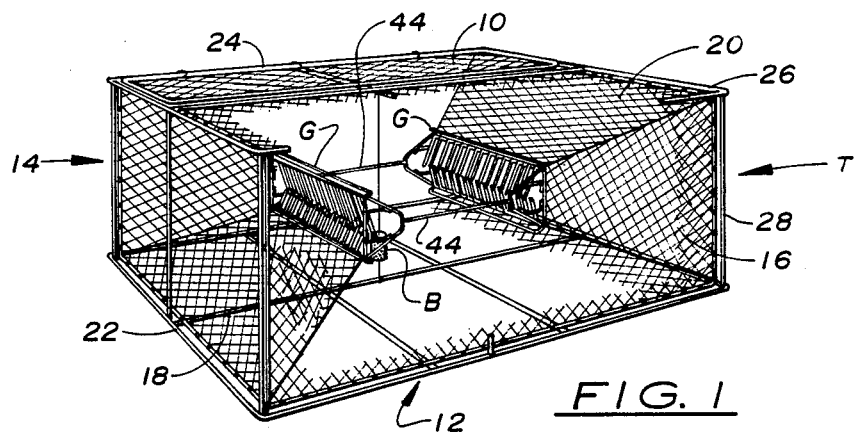
FIG. 1 is a general isometric view of a typical marine animal trap incorporating in the ends thereof entrance gates according to the present invention wherein all fingers in a row are alike with the upper row having a slightly negative buoyancy and the lower row having a slightly positive buoyancy.
Figure 2:
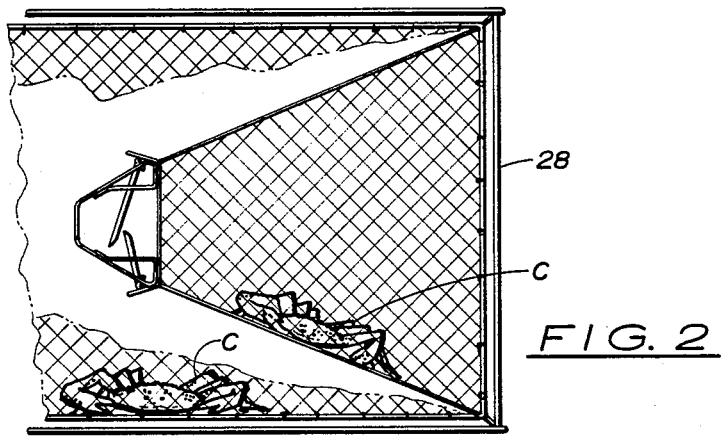
FIG. 2 is a partial side view on an enlarged scale of a trap with gates according to the present invention, with gates as shown in FIG. 1 being shown in a typical use arrangement.
Figure 3:
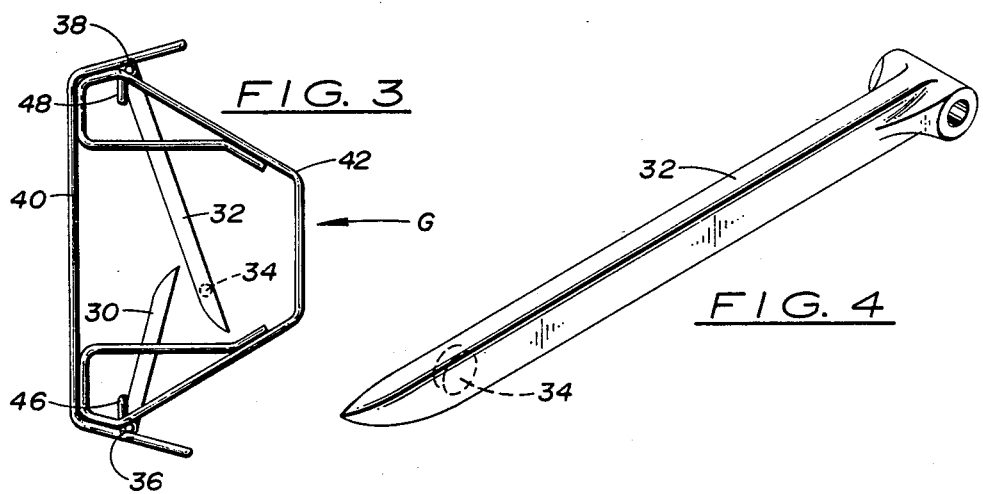
FIG. 3 is a detail side view of a trap entrance gate on a further enlarged scale, showing the gate fingers and associated structure in more detail.
Figure 4:
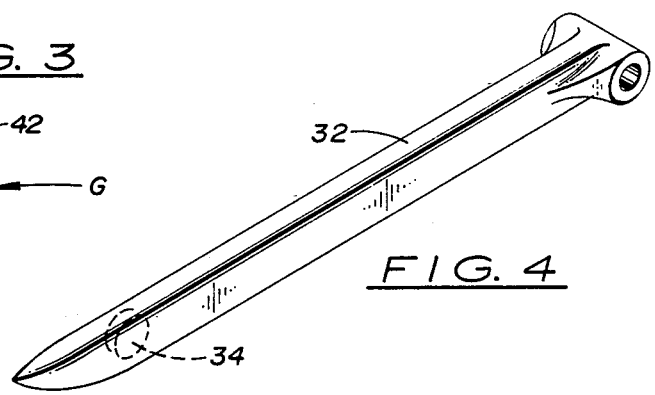
FIG. 4 is enlarged detail perspective view of one of the fingers with slightly negative buoyancy as used in the entrance gates shown in FIGS. 1-3.

Looking in more detail at the construction of one of the gates G, as perhaps best shown in FIG. 3, this embodiment of the invention comprises a plurality of fingers 30 having a slightly positive buoyancy in water and plurality of fingers 32 having a slightly negative buoyancy in water. The fingers 32 are suitably fabricated of the same material as the fingers 30 and are each provided with a weighting means in the form of embedded brass cylinder 34 ball to give it the desired slightly negative buoyancy. Fingers 30 are journaled for pivotal rotation on journal rod 36 and fingers 32 are similarly journaled for rotation on journal rod 38 running longitudinally of the gate G and forming part of the frame structure thereof which also comprises end bars 40, 42. In the makeup of the trap T the gate end bars 42 are tied together by rods 44 (FIG. 1) for structural strength and stability. Also comprising part of the framework of entrance gate G are respective stop bars 46, 48 against which respective rows of fingers 30, 32 lodge when in their normal states of rest, and in which positions they interact to close the gate against animal egress, with the respective fingers 30, 32 being maintained in such relatively closed positions by reason of their respective positive and negative buoyancies However, each of the various fingers, 30, 32 is free to rotate inwardly toward the interior of the trap T and will do so with relatively little resistance upon being engaged by an entering animal such as the crab C. The fingers 30, 32 will return to their normal states of rest (FIG. 3) once the animal has moved past the fingers. As will also be evident, the relative spacing between the various fingers 30 of the relatively positively buoyant set of fingers and the various fingers 32 of the relatively negatively buoyant set of fingers 34 and the spacing therebetween when in relatively closed position, can be varied substantially in any given gate arrangement so as to permit escape of marine animals of a size smaller than a given size. As will also be apparent, while the arrangement of the respective rows of fingers 30, 32 shown in FIGS. 1-3 is with a substantial spacing or gap between the respective free ends thereof, the arrangement can readily be such that the respective rows of fingers 30, 32 are disposed in a horizontally offset manner so as to partially overlap in an alternating or interlaced manner.

For simplicity of fabrication the various fingers 30, 32 can all be of like form, except for the weighting on each of the fingers 32, and are suitably of a "T" shape with the end or top part of the "T" being generally cylindrical in configuration and with an opening through the center of the cylinder of a size to easily pivot about the respective journal rod 36, 38 on which the finger is mounted. Preferably, however, the less than buoyant fingers 32 are about half again as long as the positively buoyant fingers 30 in the particular embodiment shown, it having been found in this regard the making of the less that buoyant fingers longer enables the fingers to operate from the point of view of maintaining the gate closed when the fingers are in their normal states of rest over a large range of angle of tilt of the trap, i.e. when the trap happens to be placed on a sloping bottom.

As indicated, the fingers are fabricated of a material slightly buoyant in water and the preferred material in this regard is an ultra high molecular weight polyethylene, commonly called UHMW, having a specific gravity of 0.92, such as marketed by Hoeschst Celanese Manufacturing Co. This material can be suitably molded into the desired shape in a high pressure molding process such as available from Solakian Mold Co. of California, for example. UHMW is a very tough material which remains pliable even when cold. It is also quite corrosion resistant so that is does not corrode in a saltwater environment. In the fabrication of the weighted fingers 32, a brass cylinder 34 or the like is embedded in or inserted into the plastic preferably near the free end of the finger, to give the finger a specific gravity of about 1.08, for example.

As indicated, ultra high molecular weight polyethylene is considered the preferred form of material for fabrication of gate fingers according to the present invention. In addition to being very corrosion resistant it is water lubricated and has a low co-efficient of friction in contact with stainless steel journal rods. It also exhibits an excellent wear factor. It will be recognized, nonetheless, that other materials having an appropriate specific gravity in relation to that of water can be operable in the context the of the present invention and are usable in the fabrication of buoyancy responsive gate fingers. In this connection a wide number of plastics are considered suitable and the term "plastic" is used herein consistent with its broad dictionary definition, i.e. an organic substance of large molecular weight, solid in its finished state and shaped by flow in its process of manufacture and also including inorganic materials of a similar character (definitions from ASTMD 833-54T and The Condensed Chemical Dictionary, 5th Edition, published by Reinhold Publishing Corporation). Consistent with this, its is also to be recognized that some plastics have a specific gravity slightly greater than water and can be suitable for use in the fabrication of the slightly negatively buoyant gate fingers according to the present invention without addition of a weighting means such as a graphite/epoxy resin, for example. As will also b evident, such a somewhat denser material can also be used for the positively buoyant fingers if make hollow to have a slightly positive net buoyancy in water.

The first embodiment of the invention as shown in FIGS. 1-4 involves an entrance gate arrangement where, for proper upward and downward mobility of the fingers, the trap T must be oriented with respect to its placement in the environment being fished so that the relatively lighter gate fingers 30 are the lower in the gate and the relatively heavier gate fingers 32 are the upper fingers in the gate, i.e. the trap is to be oriented with respect to the ocean bottom or the like so that the bottom of the trap is on the ocean bottom so to speak, i.e. the trap entrance gate if placed in the end or side of the trap will not work properly if the trap is on its side or upside down.

Figure 5:
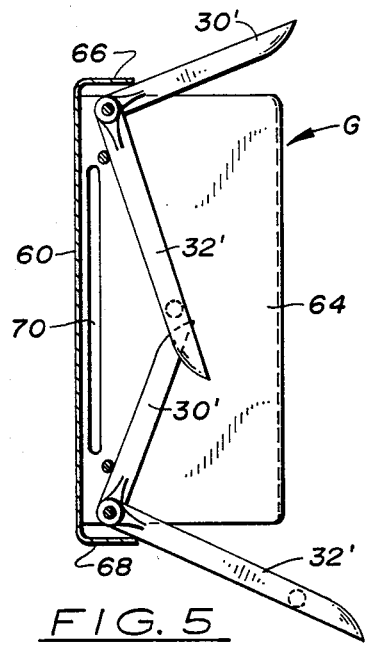
FIG. 5 is a further enlarged side view of a modified and preferred form of entrance gate according to the present invention, wherein each row of fingers comprises slightly negatively buoyant and slightly positively buoyant fingers in alternating arrangements.
Figure 8:
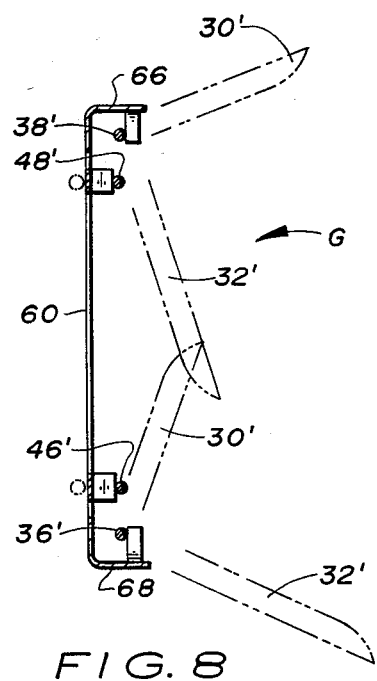
FIG. 8 is a fragmentary cross-sectional view taken in a lateral plane through the entrance gate shown in FIGS. 4-6 and further showing the journal rods, stop rods and stop rod supports in the relationship thereof to the gate frame.

The second typical embodiment of the invention, as illustrated in FIGS. 5-8, involves an entrance gate arrangement wherein, with one or more of the gates installed in a trap T in like manner as are gates G in trap T in FIG. 1, the gate is operable with the bottom of the trap oriented in the environment either bottom down or in reverse orientation, i.e. bottom up. In this second embodiment, in general, pivotable gate fingers which are slightly positively buoyant in water and pivotable gate fingers which are slightly negative in water are arranged in an alternating manner in both the upper and lower rows of fingers spanning the gate entrance opening. More-specifically, as shown in FIGS. 4-7, this gate embodiment G' comprises slightly positively buoyant fingers 30' and slightly negatively buoyant fingers 32' in alternating array (FIGS. 5 and 6) with the upper array of fingers 30', 32' being mounted for pivotal movement on journal rod 38' and with the lower row of fingers 30', 32' being mounted for pivotal movement on journal rod 36'. The respective journal rods 36', 38' longitudinally span and are mounted in fixed relation to the gate frame 60, being anchored in the angled side edges 62, 64 of the frame 60, as are respective upper and lower stop rods 48',46'. Upper and lower bent edges 66, 68 of the frame 60 also serve as stop elements as shown in FIGS. 5 and 8 in that they restrict the maximum extent of opening pivotal movement of the respective positively and negatively buoyant fingers 30', 32'.

Preferably, the frame 60 is fabricated from a single sheet of stainless steel and may be lightened by removal of material by punching holes where strength is not required, such as at opening 70 (FIG.5). Also, the entire frame 60 may be coated with porcelain or other corrosion resistant coating. Powder coatings, such as Oyxplast, marketed by the O'Brien Corporation of South San Francisco, Calif. have proven quite effective coatings for marine trap equipment.

Figure 6:
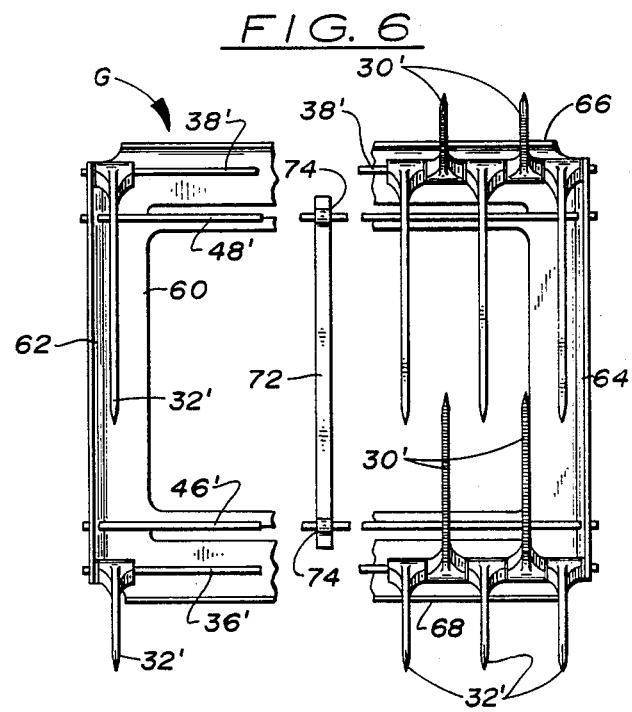
FIG. 6 is a truncated front view of the preferred embodiment, further showing the relationship of the fingers.

As shown at FIG. 6 the frame includes a center bar 72 with notched ends as at 74 so that it can be removed quickly from rods 46', 48' by a twisting motion. The center bar 72 is designed to keep large flat fish, such as halibut, from entering the trap. If it is desired to catch large flat fish, the center bar 72 may be easily removed.

Suitably, the two journal rods 36', 38' are 300 series stainless steel rod, 5/16" in diameter and are suitably end crimped to prevent axial movement. Stop rods 46', 48' and the frame edges 66, 68 prevent the various fingers 30', 32' from reaching a completely vertical position so that the relative buoyancy thereof functions at all times to either maintain or return a given finger to its normal position of rest responsive to its characteristic buoyancy.

Figure 7:
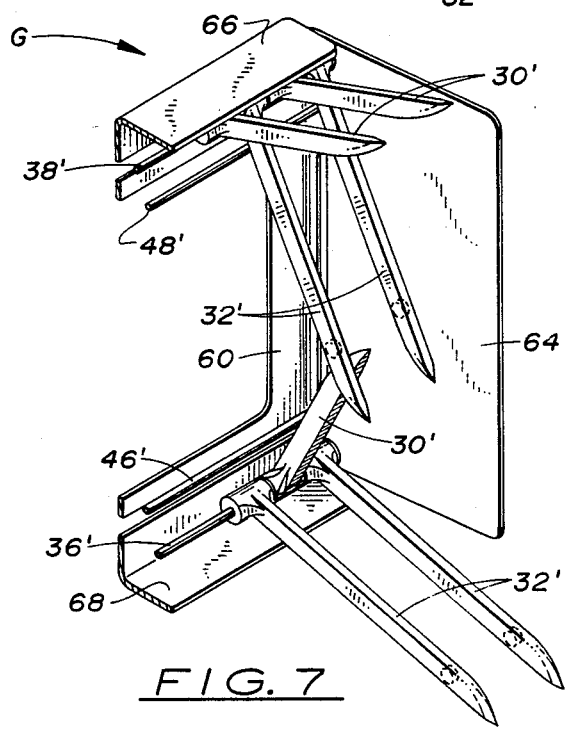
FIG. 7 is a truncated perspective view of the preferred embodiment.

As seen in FIGS. 6 and 7, the respective fingers 30′, 32′ are generally "T" shaped in like manner as the fingers employed in the embodiment of the invention shown in FIGS. 1-4 and may be similarly fabricated of like material. Similarly also, the design and arrangement of the fingers are such that the relatively negative fingers 32′ are somewhat longer than the relatively positively buoyant fingers 30′, while the respective lengths are such that the fingers overlap vertically to an extent when in the at rest positions. In a typical installation of this embodiment the weighted fingers are 9 inches long and the unweighted fingers are 5¾ inches long.

Since the fingers are fairly close to neutral buoyancy when an entering marine animal such as a fish or crab pushes against the fingers, the animal meets quite low resistance because the fingers readily move out of the way and the ingress of the animal into the trap is not impeded. Then, when the fingers return to their near vertical positions the marine animal is prevented from coming back out the entrance gate because the fingers are restrained by the respective associated stop rods.

As will be recognized, a trap T equipped with entrance gates of the type shown at G′ is usable whether the trap is bottom down or bottom up in the water environment because if the trap is bottom down the normal or at rest position of the various fingers 30′, 32′ is as shown in FIGS. 5-8, with the upper row of fingers 30′ journaled on rods 38′ engaging the edge 66 of the gate frame 60, the lower row of fingers 30′ engaging the stop bar 46′, the upper row of FIGS. 32′ engaging the stop bar 48′ and the lower row of fingers engaging the frame edge 68. Then, if the trap and the entrance gate become reversed in the water, top for bottom, the formerly upward fingers 30′ are then the lower row and then engage the stop bar 48′, the formerly lower row of fingers 30′ becomes the upper row and engages the frame 68, the formerly upper row of fingers 32′ becomes the lower row and engages the frame edge 66, and the formerly lower row of fingers 32′ becomes the upper row and engages the stop bar 46′ in the at rest positions thereof.

Figure 9:
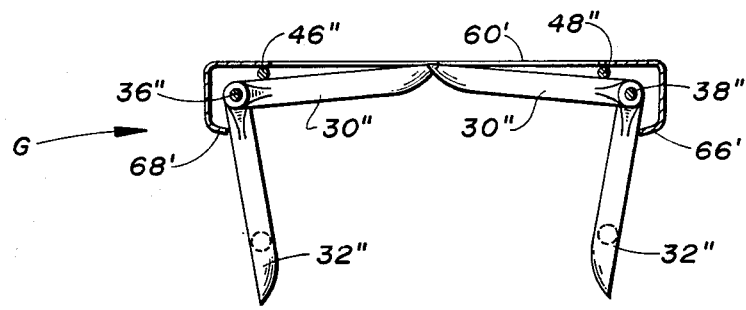
FIG. 9 is a somewhat schematic side view, partially in cross section, of another modified form of trap entrance gate according to the present invention, usable in the top or bottom of a trap, the view in this FIG. being of its manner of operation when installed in the top panel of a trap.

Certain forms of marine trap entrance gates according to the present invention are also suitable for use in orientations where the gate frame is placed horizontally in a marine trap, i.e. with the gate placed in the top or bottom panels of the trap, or both. In views similar to that of FIG. 5, FIG. 9 illustrates a top panel placed entrance gate and the at rest orientation of its gate fingers, and FIG. 10 similarly illustrates the at rest orientation of the gate fingers when the gate is placed in the bottom of a trap. As will be apparent, these adaptations of the gates according to the invention, along with those embodiments earlier discussed which have generally vertically oriented gate frames, make it possible and practical for traps to be fabricated with entrance gates on all sides and the top and bottom as well, thus materially improving the likelihood that animals will enter the trap. Even a bottom placed gate is an advantage in this respect because oftentimes traps when in place rest with one corner or edge on a boulder or the like.

Figure 10:
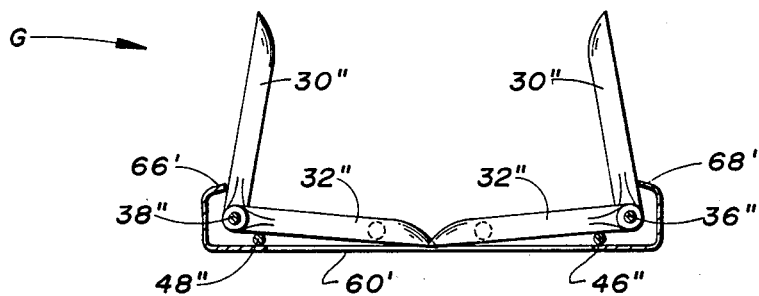
FIG. 10 is a further view of the entrance gate shown in FIG. 9, showing its manner of operation when installed in the bottom of a trap.

Considering the gate components illustrated in FIGS. 9 and 10 more specifically, the gate G″, which may be termed a vertical gate since animal ingress therethrough is in a more or less vertical direction, comprises positively buoyant fingers 30″ and negatively buoyant fingers 32″ in alternating array and journaled for pivotal rotation on journal rods 36″, 38″, with stop rods 46″, 48″ also being provided by fixed mountings in the ends of gate frame 60′, all in a manner similar to the similarly numbered components of the embodiment of the gate shown in FIGS. 5-8. In gate G″, when the gate faces out of the trap upwardly (FIG. 9) the stop rods 46″, 48″ function to restrain the "floater" fingers 30″ extending across the gate entrance from further pivotal movement and thus restrain animal egress. When the gate is oriented to face downwardly (FIG. 10), the stop means for the "floater" fingers 30″, provided by the respective edges 66′, 68′ of the frame 60′, are located closer together than is the case with the comparable stop means 66, 68 in the FIGS. 5-8 embodiment. This frame edge configuration as shown in FIGS. 9 and 10, is dictated by the need for the fingers to be in a somewhat less than vertical position when engaging the associated stop elements, i.e. when "sinker" fingers 32″ so engage the stop means when the gate faces upwardly (FIG. 9) and the "floater" fingers 30″ are so engaged when the gate faces downwardly (FIG. 10), the finger orientation is with a horizontal vector component i.e. lateral tilt, in order that buoyancy responsive movement of the finger can occur from one position of rest of the finger the other position of rest in the event the attitude of the gate is reversed relative to the environment. It will also be evident that this is not a requirement for what may be termed a horizontal gate such as the gate illustrated in FIGS. 5-8, comparing in particular the finger positions shown in FIG. 5 in this respect.

In their most basic forms, marine trap entrance gates according to the present invention can involve but a single row of plastic fingers, either slightly positively buoyant or slightly negatively buoyant in water, pivotally mounted to extend across the gate entrance when at rest responsive to the characteristic relative buoyancy thereof in water and in such position engaged with stop means restraining outward pivotal movement beyond such state of rest yet free to pivotally move inwardly so as to not impede animal ingress, such fingers being automatically returned to a state of rest after being pivotally moved by an animal entering and passing through the gate. In short, this invention offers to the art trap entrance means with plural pivotally movable fingers which are normally in entrance closing orientation and which are maintained closed by relative buoyancy of the fingers with the respect to the water and which reclose by buoyancy action after an animal passes through the gate.

Marine animal entrance gates according to the present invention are usable in any situation where it is advantageous to allow easy animal ingress and to prevent animal egress from the trap by means of buoyancy responsive fingers, with the operative parts of the gate being easy to fabricate, extremely durable, easy to replace, and effective in use even under the most severe climatic condition.

Other applications, adaptations, and modifications of apparatus embodying the invention will readily occur to those skilled in the art to which the invention is addressed without departing form the scope of the invention as defined by the following claims.

I claim:

1. A marine animal trap including entrance means comprising a plurality of pivotally movable fingers which are positively buoyant in water and arranged to normally be in trap entrance blocking position, said fingers being maintained in such position by relative buoyancy of the fingers with the fingers automatically returning to such position by buoyancy action after the fingers are moved by an animal entering the trap through the trap entrance means.

2. A marine animal trap according to claim 1, comprising fingers fabricated of plastic.

3. A marine animal trap according to claim 2, wherein certain fingers are slightly positively buoyant in water and certain others are negatively buoyant in water.

4. An animal trap according to claim 3, wherein the negatively buoyant fingers include weighting means providing the finger with a slightly negative buoyancy in water.

5. A marine trap entrance gate comprising a plurality of plastic fingers having a characteristic relative buoyancy in water, means pivotally mounting said fingers to extend at least partially across the gate entrance when at rest responsive to the characteristic relative buoyancy thereof in water, stop mean engaged by said fingers when in such at rest position and restraining outward pivotal movement thereof beyond such state of rest, said fingers nonetheless being free to pivotally move inwardly so as not to impede animal movement into the gate, and said finger being automatically returned to the state of rest by buoyancy action after being pivotally moved by an animal passing through the gate.

6. A marine animal trap entrance gate according to claim 5 wherein the fingers are each mounted for independent pivotal movement on journal rod means extending longitudinally along a side of the gate entrance.

7. A marine animal trap entrance gate according to claim 6, wherein some of the pivotally movable fingers are positively buoyant in water and others are negatively buoyant in water, with the positively buoyant fingers arranged in a row along one side of the gate entrance with the negatively buoyant fingers arranged in a row along the other side of the gate entrance.

8. A marine animal trap entrance gate according to claim 6, wherein some of the fingers are positively buoyant in water and some of the fingers are negatively buoyant in water, with the fingers arranged in rows at opposite sides of the gate entrance, and with positively buoyant fingers and negatively buoyant fingers arranged alternately in each row.

9. A marine animal trap entrance gate according to claim 5, wherein said stop means comprises rod means extending longitudinally along a side of the gate entrance.

10. A marine animal trap entrance gate according to claim 5, wherein the fingers are formed of a molded ultra high molecular weight polyethylene journaled for pivotal movement on stainless steel journal rod means.

11. A marine animal trap entrance gates according to claim 5, wherein the fingers are generally "T" shape in form with the generally short part of the "T" having a cylindrical bore journaled onto a journal rod, and wherein the opposite end of the finger is of pointed form.

12. A marine animal trap comprising entrance gate means including a plurality of plastic fingers fabricated of a material having a slight positive buoyancy in water, means mounting said plurality of fingers for independent pivotal movement in a generally vertical direction, and so that the fingers are disposed at least partially across the gate entrance when nominally at rest with the trap in water, and stop means restraining such fingers are restrained from outward pivotal movement when in such state of rest, the mounting of the fingers also being such that the fingers provide minimal resistance to animal ingress through the gate.

13. A marine animal trap according to claim 12, wherein the fingers are formed of a molded ultra high molecular weight polyethylene and are journaled for pivotal movement on stainless steel journal rod means.

14. A marine animal trap according to claim 12, wherein the fingers are generally "T" shape in form with the generally short part of the "T" having a cylindrical bore journaled onto a journal rod, and wherein the opposite end of the finger is of pointed form.

15. A marine animal trap comprising entrance gate means including a plurality of plastic fingers which are positively buoyant in water a nd a plurality of plastic fingers which are negatively buoyant in water, the arrangement and mounting of the fingers being such that positively and negatively buoyant fingers collectively span and block the gate entrance against animal egress when nominally at rest in water, and stop means against which the fingers rest when in such nominal state of rest and which prevent movement of the fingers outwardly of the trap, the mounting and arrangement of the fingers being such that the fingers are freely pivotally movable inwardly of the trap from such state of rest so as to provide minimal resistance to animal ingress through the gate.

16. A marine animal trap according to claim 15, wherein the slightly positively buoyant fingers partially span the gate entrance when at rest and certain other slightly negatively buoyant fingers also partially span the gate entrance when at rest, with the slightly negatively buoyant fingers being somewhat longer than the slightly positively buoyant fingers.

17. A marine animal trap according to claim 15, wherein some of the pivotally movable fingers are positively buoyant in water and others are negatively buoyant in water, with the positively buoyant fingers arranged in a row along one side of the gate entrance with the negatively buoyant fingers arranged in a row along the other side of the gate entrance.

18. A marine animal trap according to claim 15, wherein some of the fingers are positively buoyant in water and some of the fingers are negatively buoyant in water, with the fingers arranged in rows at opposite sides of the gate entrance, and with positively buoyant fingers and negatively buoyant fingers arranged alternately in each row.

19. A marine animal trap according to claim 15, wherein the fingers are mounted for pivotal movement on journal rod means extending longitudinally along a side of the gate entrance.

20. A marine animal trap according to claim 15, wherein said stop means comprises rod means extending longitudinally along a side of the gate entrance.

21. A marine animal trap according to claim 15, wherein the fingers are formed of a molded ultra high molecular weight polyethylene journaled for pivotal movement on stainless steel journal rod means.

22. A marine animal trap according to claim 15, wherein the fingers are generally "T" shape in form with the generally short part of the "T" having a cylindrical bore and wherein the opposite end of the finger is of pointed form.

* * * * *